(12) United States Patent
Tian et al.

(10) Patent No.: US 8,761,541 B2
(45) Date of Patent: Jun. 24, 2014

(54) COMFORT NOISE AND FILM GRAIN PROCESSING FOR 3 DIMENSIONAL VIDEO

(75) Inventors: Dong Tian, Plainsboro, NJ (US); Dekun Zou, Princeton Junction, NJ (US)

(73) Assignee: Thomson Nlicensing, Issy les Moulineaux (FR)

( * ) Notice: Subject to any disclaimer, the term of this patent is extended or adjusted under 35 U.S.C. 154(b) by 120 days.

(21) Appl. No.: 13/642,727

(22) PCT Filed: May 11, 2010

(86) PCT No.: PCT/US2010/001391
§ 371 (c)(1),
(2), (4) Date: Oct. 22, 2012

(87) PCT Pub. No.: WO2011/142734
PCT Pub. Date: Nov. 17, 2011

(65) Prior Publication Data
US 2013/0039597 A1    Feb. 14, 2013

(51) Int. Cl.
*G06K 9/40* (2006.01)
*H04N 7/26* (2006.01)
*H04N 13/00* (2006.01)

(52) U.S. Cl.
CPC ..... *H04N 13/0018* (2013.01); *H04N 19/00909* (2013.01)
USPC .................................. 382/275; 704/E19.006

(58) Field of Classification Search
USPC ...................... 348/666; 358/3.26; 375/E7.19; 382/275; 704/E19.006
See application file for complete search history.

(56) References Cited

U.S. PATENT DOCUMENTS

| 6,269,180 | B1 | 7/2001 | Sevigny | |
|---|---|---|---|---|
| 8,369,640 | B2* | 2/2013 | Ishiga | 382/254 |
| 2002/0190931 | A1 | 12/2002 | Thebault et al. | |
| 2007/0047658 | A1* | 3/2007 | Tourapis et al. | 375/240.25 |
| 2007/0058878 | A1 | 3/2007 | Gomila et al. | |
| 2009/0024033 | A1* | 1/2009 | Murashita | 600/443 |
| 2009/0160931 | A1 | 6/2009 | Pockett et al. | |
| 2010/0183236 | A1* | 7/2010 | Kang et al. | 382/260 |

FOREIGN PATENT DOCUMENTS

| EP | 1081654 | 3/2001 |
|---|---|---|
| EP | 1771818 | 4/2007 |
| JP | 2121491 | 5/1990 |
| JP | 9102968 | 4/1997 |
| JP | 2001143100 | 5/2001 |
| JP | 2004240910 | 8/2004 |
| KR | 100898851 | 12/2002 |
| WO | WO-0038434 | 6/2000 |
| WO | WO-2006010276 | 2/2006 |

OTHER PUBLICATIONS

Schreer,O. et al: "3D Video Communication" Book, published by John Wiley & Sons, Ltd. 2005.
Boyce, J. et al: "Comfort Noise for Compressed Video", Consumer Electronics Conference, Jan. 8, 2005, pp. 323-324.

(Continued)

*Primary Examiner* — Gregory F Cunningham
(74) *Attorney, Agent, or Firm* — Robert D. Shedd; Robert B. Levy

(57) ABSTRACT

Noise, either in the form of comfort noise or film grain, is added to a three dimensional image in accordance with image depth information to reduce human sensitivity to coding artifacts, thereby improving subjective image quality.

15 Claims, 4 Drawing Sheets

(56) References Cited

OTHER PUBLICATIONS

Gomila, C. : SEI Message for Film Grain Encoding Syntax and Results; JVT of ISO/IEC MPEG & ITU-T VCEG, 7th Meeting, San Diego, California. Sep. 2, 2003, pp. 1-12.

Tian.D. et al: "View Synthesis Techniques for 3D Video", App. of Digital Image Processing XXXII, Proc. of SPIE, vol. 7443. 2009 SPIE, pp. 1-12.

Nath, V. et al.: "Video Noise Reduction in 3-D Mixed Transform Domain Using its Efficient Wavelet Structure". Annual IEEE India Conference, Dec. 18, 2009, pages.

* cited by examiner

COMFORT NOISE AND FILM GRAIN PROCESSING FOR 3 DIMENSIONAL VIDEO

This application is a National Stage Application and claims the benefit, under 35 U.S.C. §365 of International Application PCT/US2010/001391 filed May 11, 2010 which was published in accordance with PCT Article 21(2) on Nov. 17, 2011 in English.

TECHNICAL FIELD

This invention relates to the addition of noise to digital image.

BACKGROUND ART

Over time, television has evolved from black and white images to color images and now high definition. Currently, some manufacturers of television equipment have begun to market products capable of originating and displaying images in three dimensions (3D). The newly emerging 3D television displays currently incur several sources of visual discomfort, including: keystone distortion, depth plane curvature, magnification, miniaturization effects, shear distortion, crosstalk, picket fence effects and image flipping. In addition, visual discomfort can also arises from the lack of depth cue, e.g., picture areas with high motion, resulting in blurriness. Viewers often experience an uncomfortable feeling when viewing areas in an image having a lack of depth cue. Differences in random noise associated with film grain in the left-eye and right eye views of a 3D image can also cause strange visual effects to appear.

The addition of a dither signal to a digital image can reduce human sensitivity to coding artifacts, such as contouring and blocking artifacts, and can improve subjective quality. Adding noise, typically referred to as "Comfort noise" to video serves to achieve this goal. While technique for adding comfort noise to a two dimensional image exist, no known techniques exist for comfort noise to a 3D image.

BRIEF SUMMARY OF THE INVENTION

Briefly, in accordance with a preferred embodiment of the present principles, there is provided a method for adding noise to a three-dimensional image, comprising the step of adding noise to different areas of the image in accordance with image depth.

DETAILED DESCRIPTION

Figure 1:
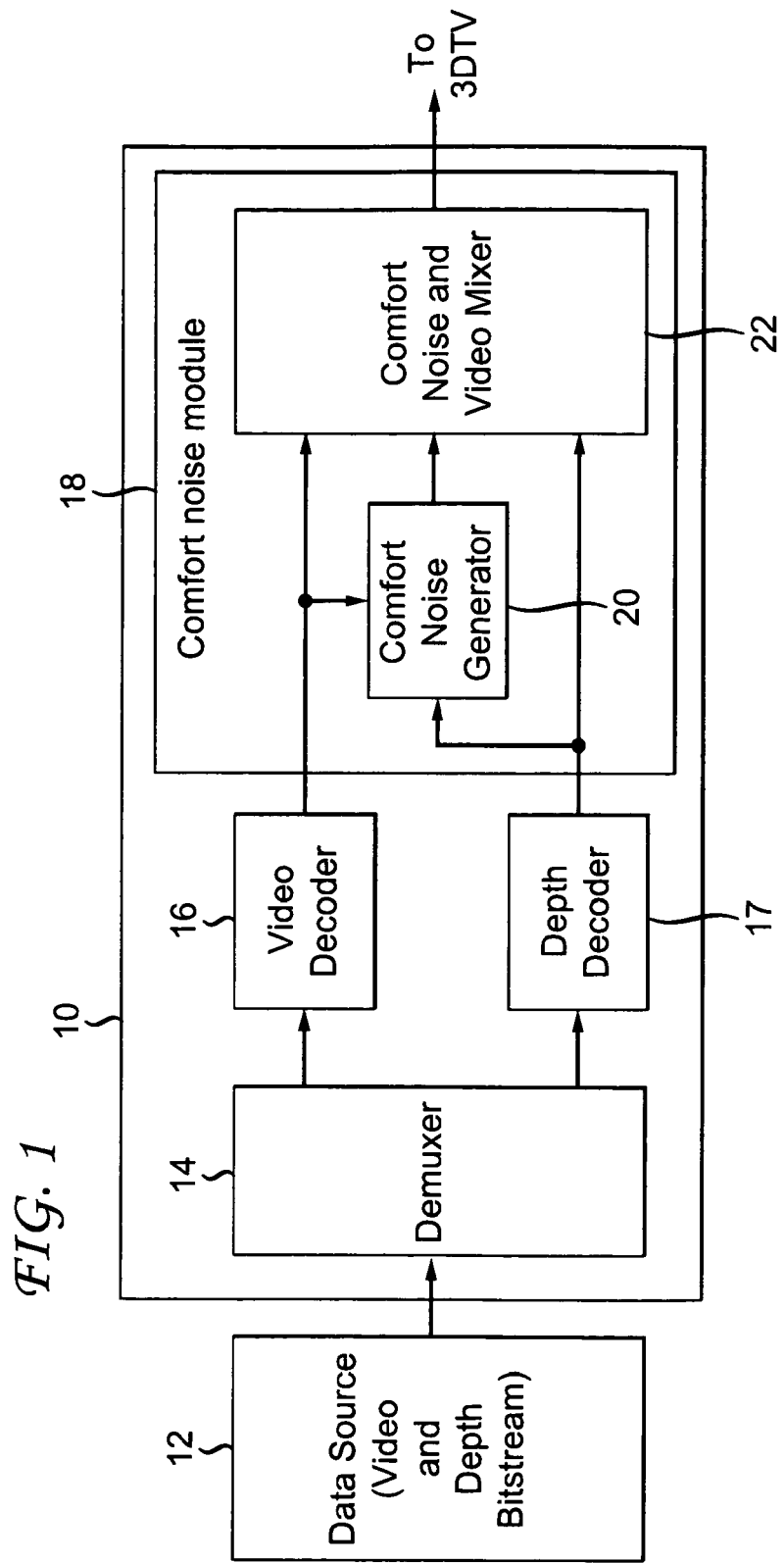
FIG. 1 discloses an exemplary embodiment of apparatus according to the present principles for adding noise to a three-dimensional image in accordance with the present principles.

FIG. 1 depicts a block schematic diagram of an apparatus 10, in accordance with preferred embodiment of the present principles for adding noise to a three dimensional image, typically a digital image. As discussed in greater detail below, the noise can take the form of "comfort" noise of the type added to an image to reduce artifacts. Alternatively, in the case of a digital image containing video that originated from motion picture film, the noise can take the form of film grain for mimicking the look of motion picture film. Hereinafter, when referring to noise addition, the added noise can comprise film grain or comfort noise.

The apparatus 10 can take different forms. In the illustrative embodiment, the apparatus 10 comprises a set-top box that receives a bit stream containing video and depth information from a data source 12, such as a cable system head end. A de-multiplexer 14 (depicted in FIG. 1 as a "demuxer") separates the video and depth information for decoding by video and depth decoders 16 and 17, respectively. A comfort noise module 18 generates comfort noise from the decoded video and depth information to yield three dimensional (3D) video output signal for receipt by a 3D television receiver (not shown).

The comfort noise module 18 comprises a comfort noise generator 20 which generates comfort noise in accordance with the decoded video and depth information supplied from the video and depth decoders 16 and 17, respectively. In practice, the noise generator 20 can take the form of a processor (not shown) for executing program instructions. The manner in which the comfort noise generator 20 generates comfort noise in accordance with the decoded video and depth information will become better understood hereinafter by reference to FIG. 2 and its accompanying description. A comfort noise and video mixer 22 combines the comfort noise from the comfort noise generator 20 with the decoded video and depth information to yield the 3D video output signal.

Figure 2:
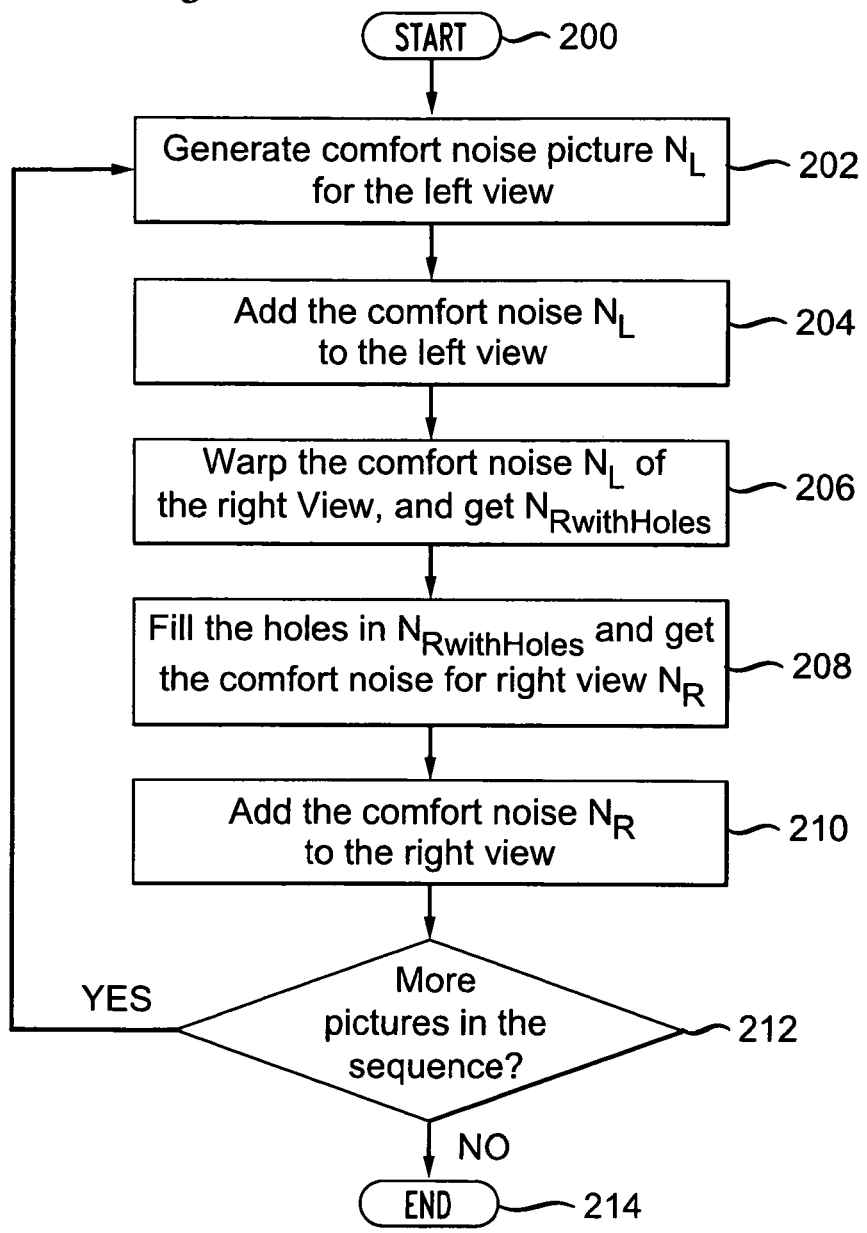
FIG. 2 depicts in flowchart form the steps of a method according to a first exemplary embodiment of the present principles for execution by the apparatus of FIG. 1 for adding noise to a three-dimensional image.

FIG. 2 depicts in flow chart form the steps of a method in accordance with a preferred embodiment of the present principles for generating comfort noise. In other words, the method of FIG. 2 constitutes the instructions for the processor within the noise generator 20. The method of FIG. 2 commences with start step 200 during which initialization occurs. Thereafter, step 202 undergoes execution to generate a comfort noise value $N_L$ for the left view. As will become better understood hereinafter, typical 3D video images containing motion comprise pairs of pictures, each pair containing left and right views. The noise generation of technique of the present principles generates comfort first for the left view picture of the pair and uses that value to then generate comfort noise for the right view picture of the pair.

To generate noise for the left view picture of the pair, the comfort noise generator 20 of FIG. 1 makes use of an additive noise model in which noise for a given picture (hereinafter referred to as a "noise" picture) N can be represented mathematically by the relationship:

$$N(k, x, y) = \alpha(k, x, y) \times N(k-1, x, y) + (1-\alpha(k, x, y)) \times \beta(k, x, y) \times R(k, x, y) \quad \text{(Equation 1)}$$

where k is the frame number, x, y, are the horizontal and vertical coordinates of a pixel. R(k, x, y) is a random number, typically with a Gaussian or Laplacian distribution. $\alpha(k, x, y)$ and $\beta(k, x, y)$ are the temporal correlation and brightness factors respectively and take values in the range between 0 and 1. $\alpha(k, x, y)$ depends on the temporal correlation between the reconstructed image pixel or its corresponding block with the co-located pixel or block in the previously displayed picture, while $\beta(k, x, y)$ depends on the brightness of the current pixel or its associated block. Following the generation of the comfort noise picture ($N_L$) for the left view picture during step 202 using Equation (1), this noise picture is added to the left view picture during step 204.

Following step 204, synthesis of a noise picture ($N_R$) for the right view picture occurs. Synthesis of the right view noise picture $N_R$ occurs in several steps. First, during step 206, the left noise picture $N_L$ undergoes warping to obtain a right view noise picture ($N_{RwithHoles}$) that typically has "holes" or missing values. The manner in the filling of such holes occurs will become clear hereinafter by reference to FIG. 3.

The process of warping a 3D picture typically entails projecting pixels from one or images to a new view point and reference plane. Various techniques exist in the art for accomplishing 3D image warping using scene and depth information, as can be obtained from the video and depth decoders 16 and 17, respectively of FIG. 1. For example, Depth-based Image Rendering constitutes a well known process for synthesizing virtual views from a reference image and associated depth information using matrix multiplication.

Following step 206, step 208 of FIG. 2 undergoes execution to fill the holes in the right view noise picture ($N_{RwithHoles}$) to yield a more complete right view noise picture ($N_R$). The process by which hole filling occurs will become better understood by reference to FIG. 3. The right view noise picture ($N_R$) then gets added to the right noise view during step 210. Next, step 212 undergoes execution to check if additional pictures exist in the video image for processing. If no additional pictures exist for processing, then the process ends at step 214. Otherwise, steps 202-212 undergo execution again until no further pictures exist.

The comfort noise addition method depicted in FIG. 2 presumes that the left and right noise pictures have the same disparity as the video image. As compared to simply adding the same noise to the right and left views or separately adding noise pictures, the comfort noise addition technique of the present principles, which relies on depth information to synthesize the noise pictures, empirically offers the best viewing quality.

Figure 3:
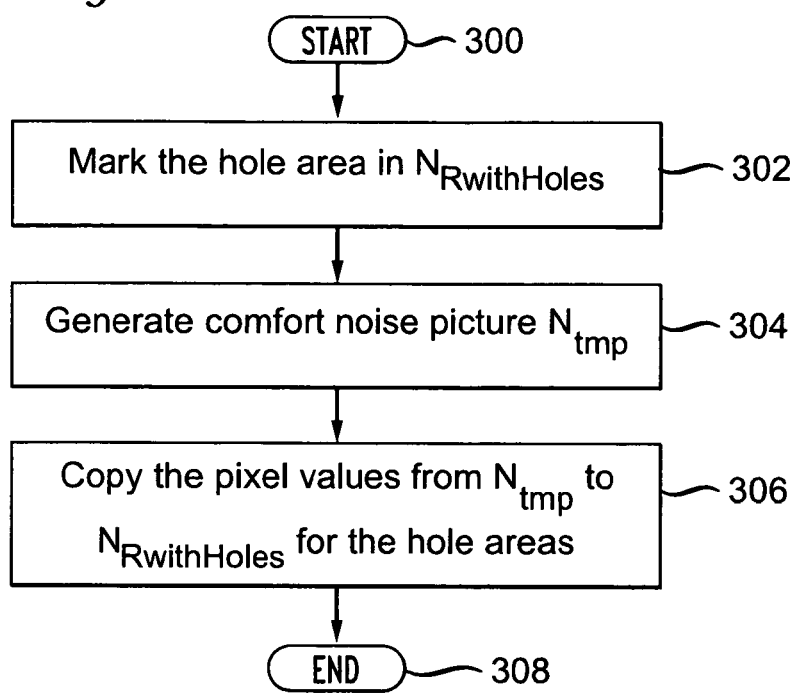
FIG. 3 depicts in flow chart form the steps of a method in accordance with second preferred embodiment for adding noise to a three dimensional image.

FIG. 3 depicts in flow chart form the steps of a method in accordance with the present principles for filling holes (missing values) in the right view noise picture ($N_{RwithHoles}$). Unlike the conventional hole filling problem, where ground truth information in the area of holes exists but remains disoccluded from other viewpoints, no such ground truth information exists in the hole area of the warped noise picture. To overcome this problem, the hole-filling method of the present principles does not propagate the background noise, but instead generates new noise information. Generating new noise results in reduced artifacts so the left and right view pictures look more natural following the addition of comfort noise.

The method of FIG. 3 commences at step 300 during which initialization. Next, step 302 undergoes execution to mark or otherwise identify the areas (i.e. the "holes) in the right view noise picture ($N_{RwithHoles}$) that need filling, that is, areas that have missing values that need correction. During step 304, the comfort noise generator 20 of FIG. 1 generates comfort noise for each "hole" based on the image and depth information for the pixels which comprise that hole. Thereafter, the noise values generated for the holes during step 304 get copied into the right view noise picture ($N_{RwithHoles}$) to yield a more complete right nose picture ($N_R$). Thereafter, the process ends at step 308.

Images recorded on motion picture film usually exhibit perceptible grain. Such grain constitutes the random optical texture of processed photographic film due to the presence of small grains of a metallic silver developed from silver halide that have received enough photons. Thus, the film grain in different pictures or views remains independent of each other. When viewing film in a 3D mode, the unrelated noise causes uncomfortable visual effects.

Figure 4:
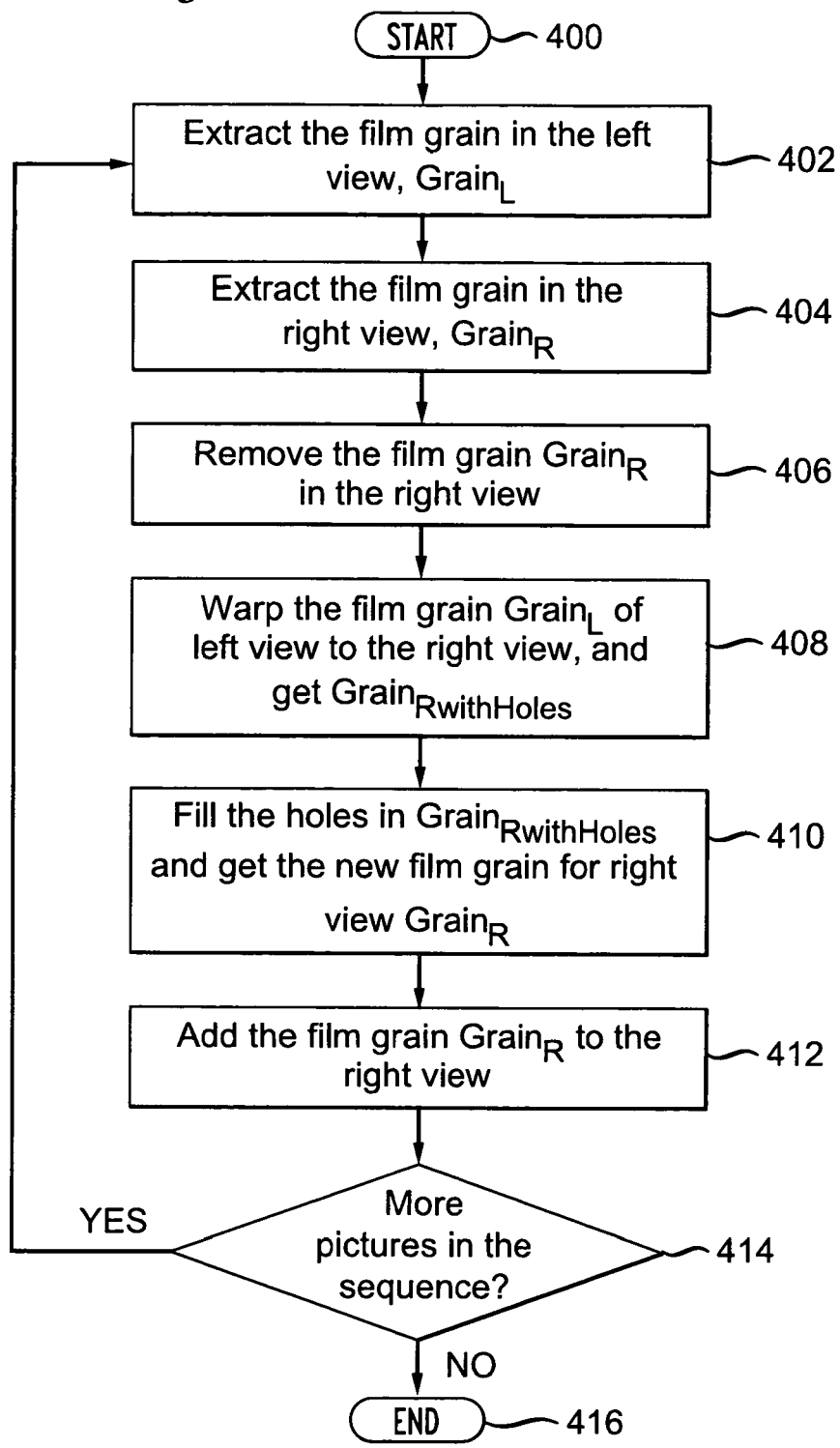
FIG. 4 depicts in flow chart form the steps of a method in accordance with a second preferred embodiment of the present principles for adding film grain to a three dimensional image.

In accordance with another embodiment of the present principles, film grain originally present in an image gets extracted and replaced with film grain especially synthesized for 3D viewing to avoid uncomfortable visual effects. FIG. 4 depicts in flow chart form the steps of a method for extracting the original grain and synthesizing film grain based on depth information.

The method of FIG. 4 commences upon execution of start step 400 during which initialization occurs. Thereafter, the film grain (Grain') present in the left view picture gets extracted during step 402. An existing film grain extractor (not shown) can serve to extract the grain. Since film grain appears temporally uncorrelated, but with some spatial correlation, one or more temporal filters (not sown) can remove the film grain. The difference between the temporally smoothed image after filtering and the original image comprises the extracted film grain. After step 402, step 404 undergoes execution during which film grain ($Grain_R$) gets extracted from the right view picture using a similar technique.

Following step 404, Step 406 gets executed to remove film grain from the right view picture. Thereafter, the extracted film grain ($Grain_L$) for the left view picture undergoes warping during step 408 to yield synthesized grain ($Grain_{RwithHoles}$) for the right view picture. The warping of the extracted film grain ($Grain_L$) for the left view occurs in a manner similar to the process of warping the left view comfort noise picture discussed previously with respect to step 206 of FIG. 2. The holes present in the synthesized grain ($Grain_{RwithHoles}$) get filled during step 410 in a manner similar to that discussed in connection with step 208 of FIG. 2 to yield a more film grain ($Grain_R$) for the right view picture. After step 410, step 412 undergoes execution during which time, the more complete right grain ($Grain_R$) gets added to the right view picture. Step 414 following step 412 during which time, a check occurs to determine if additional pictures exist in the video image for processing. If no additional pictures exist for processing, then the process ends at step 416. Otherwise, steps 402-412 undergo execution again until no further pictures exist for processing.

As discussed above, the film grain noise addition technique of FIG. 4 operates by extracting and removing film grain in the left and right view pictures. Instead of warping the extracted film grain from the left view to the right view, comfort noise could get added to the left and right views using the technique described with respect to FIGS. 2 and 3.

For all the embodiments described herein, the noise addition technique of the present principles can operate by warping the right view picture comfort noise and film grain to yield the left view noise and comfort grain, respectively, as opposing to warping the left view noise and film grain as described.

The foregoing describes a technique for adding noise to a digital image.

The invention claimed is:

1. A method for adding noise to a three-dimensional image, comprising the step of adding noise to different areas of the image in accordance with image depth.

2. The method according to claim 1 wherein the noise comprises comfort noise.

3. The method according to claim 1 wherein the noise comprises film grain.

4. The method according to claim 1 wherein the three dimensional image has first and second views and wherein the noise is added to the first and second views in accordance with image depth.

5. The method according to claim 1 wherein the step of adding noise further comprises the steps of:
   calculating noise for a first view in the image;
   adding the calculated noise to the first view picture;
   synthesizing noise for a second view picture from the noise calculated for the first view picture in accordance with image depth;
   adding the synthesized noise to the second view picture.

6. The method according to claim 5 wherein the step of synthesizing noise for a second view picture further includes the steps of:
   identifying areas in the synthesized noise in which values are missing; and
   filling the identified areas with noise.

7. A method for adding film grain to a three dimensional image having first and second view picture, comprising the steps of:
   extracting film grain from the first view picture;
   removing grain from the second view picture;
   synthesizing film grain for the second view picture from the extracted film grain for the first view picture based on image depth; and
   adding the synthesized film grain to the second view picture.

8. The method according to claim 7 wherein the step of synthesizing film grain for the second view picture further includes the steps of:
   identifying areas in the synthesized film in which values are missing; and
   filling the identified areas with film grain.

9. A method for adding film grain to a three dimensional image having first and second view picture, comprising the steps of:
   removing film grain from the first view picture;
   removing grain from the second view picture;
   generating one of comfort noise and film grain for the first view picture;
   synthesizing one of comfort noise and film grain for the second view picture from the generated one of comfort noise and film grain for the first view picture based on image depth; and
   adding the synthesized one of comfort noise and film grain to the second view picture.

10. The method according to claim 9 wherein the step of synthesizing one of comfort noise and film grain for the second view picture further includes the steps of:
    identifying areas in the synthesized one of comfort noise and film in which values are missing; and
    filling the identified areas with one of comfort noise and film grain.

11. Apparatus for adding noise to a three-dimensional image comprising a noise generator for adding noise to different areas of the image in accordance with image depth.

12. The apparatus according to claim 11 wherein the noise generator further comprising:
    means for calculating noise for a first view in the image;
    means for adding the calculated noise to the first view picture;
    means for synthesizing noise for a second view picture from the noise calculated for the first view picture in accordance with image depth;
    means for adding the synthesized noise to the second view picture.

13. The apparatus according to claim 12 wherein the means for synthesizing noise for a second view picture further includes of:
    means for identifying areas in the synthesized noise in which values are missing; and
    means for filling the identified areas with noise.

14. Apparatus for adding film grain to a three dimensional image having first and second view picture, comprising:
    means for extracting film grain from the first view picture;
    means for removing grain from the second view picture;
    means for synthesizing film grain for the second view picture from the extracted film grain for the first view picture based on image depth; and
    means for adding the synthesized film grain to the second view picture.

15. The apparatus to claim 14 wherein the means for b1The apparatus according to claim 10 wherein the means for synthesizing synthesizing film grain for the second view picture further includes:
    means identifying areas in the synthesized film in which values are missing; and
    means for filling the identified areas with film grain.

* * * * *